United States Patent
Yu et al.

(10) Patent No.: US 10,289,918 B2
(45) Date of Patent: May 14, 2019

(54) METHOD AND APPARATUS FOR DETECTING A SPEED OF AN OBJECT

(71) Applicant: PINHOLE (BEIJING) TECHNOLOGY CO., LTD., Beijing (CN)

(72) Inventors: Gang Yu, Beijing (CN); Chao Li, Beijing (CN); Qizheng He, Beijing (CN); Muge Chen, Beijing (CN); Yuxiang Peng, Beijing (CN); Qi Yin, Beijing (CN)

(73) Assignee: PINHOLE (BEIJING) TECHNOLOGY CO., LTD., Beijing (CN)

( * ) Notice: Subject to any disclaimer, the term of this patent is extended or adjusted under 35 U.S.C. 154(b) by 175 days.

(21) Appl. No.: 15/391,449

(22) Filed: Dec. 27, 2016

(65) Prior Publication Data
US 2017/0193310 A1    Jul. 6, 2017

(30) Foreign Application Priority Data

Dec. 31, 2015 (CN) .......................... 2015 1 1032318

(51) Int. Cl.
G06K 9/46 (2006.01)
G06K 9/00 (2006.01)
(Continued)

(52) U.S. Cl.
CPC ..... G06K 9/00785 (2013.01); G06K 9/00718 (2013.01); G06K 9/46 (2013.01);
(Continued)

(58) Field of Classification Search
None
See application file for complete search history.

(56) References Cited

U.S. PATENT DOCUMENTS

| 2004/0258279 | A1* | 12/2004 | Hirvonen | G06K 9/00201 |
| | | | | 382/104 |
| 2010/0183192 | A1* | 7/2010 | Fritsch | G06T 7/254 |
| | | | | 382/103 |

(Continued)

FOREIGN PATENT DOCUMENTS

| CN | 101425128 | 5/2009 |
| CN | 102622895 | 8/2012 |

(Continued)

OTHER PUBLICATIONS

CN 101425128 english translation; Han et al May 6, 2009.*

(Continued)

*Primary Examiner* — Nancy Bitar
(74) *Attorney, Agent, or Firm* — Hamre, Schumann, Mueller & Larson, P.C.

(57) ABSTRACT

A method and an apparatus for measuring a speed of an object are provided, the method comprising: acquiring, for each image frame of at least two image frames in an image sequence, image information of the image frame, wherein the image information comprises depth information; detecting at least one object in the image frame based on the depth information to obtain an object detection result for the image frame; tracking the at least one detected object based on the object detection result of each of the at least two image frames to obtain an object tracking result; and calculating the speed of the at least one detected object based on the object tracking result and a time difference between the at least two image frames.

18 Claims, 4 Drawing Sheets

(51) Int. Cl.
*G06K 9/62* (2006.01)
*G06N 3/04* (2006.01)
*G06N 3/08* (2006.01)
*G06T 7/20* (2017.01)
*G06T 7/90* (2017.01)
*G06T 7/246* (2017.01)

(52) U.S. Cl.
CPC ......... *G06K 9/6256* (2013.01); *G06K 9/6277* (2013.01); *G06N 3/04* (2013.01); *G06N 3/08* (2013.01); *G06T 7/20* (2013.01); *G06T 7/248* (2017.01); *G06T 7/90* (2017.01); *G06T 2207/10016* (2013.01); *G06T 2207/10024* (2013.01); *G06T 2207/10028* (2013.01); *G06T 2207/10048* (2013.01); *G06T 2207/20081* (2013.01); *G06T 2207/20084* (2013.01); *G06T 2207/30236* (2013.01); *G06T 2207/30241* (2013.01)

(56) References Cited

U.S. PATENT DOCUMENTS

2012/0027258 A1* 2/2012 Uchida .............. G06K 9/00805
382/103

2015/0104062 A1* 4/2015 Huang .................... G06T 7/194
382/103
2016/0131882 A1* 5/2016 Wallace ............. G02B 21/0056
356/458
2017/0286774 A1* 10/2017 Gaidon ............. G06K 9/00718

FOREIGN PATENT DOCUMENTS

| CN | 102867311 | 1/2013 |
| CN | 103077423 | 5/2013 |
| CN | 104155470 | 11/2014 |
| DE | 10258794 | 6/2004 |
| WO | 2004107266 | 12/2004 |

OTHER PUBLICATIONS

CN 10262895 english translation ; Song et al Aug. 1, 2012.*
First Office Action, issued in the corresponding Chinese patent application No. 2015110323189, dated Mar. 28, 2018, 23 pages.
Second Office Action, issued in the corresponding Chinese patent application No. 201511032318.9, dated Dec. 5, 2018, 22 pages.

* cited by examiner

METHOD AND APPARATUS FOR DETECTING A SPEED OF AN OBJECT

CROSS-REFERENCE TO RELATED APPLICATION

The present disclosure claims the benefits of and priority of Chinese patent application No. 201511032318.9 filed on Dec. 31, 2015, the disclosure of which is incorporated herein by reference in its entirety.

TECHNICAL FIELD OF THE DISCLOSURE

The present disclosure relates to the filed for image processing, and particularly to a method and an apparatus for detecting a speed of an object.

BACKGROUND

How to measure a speed of an object efficiently and accurately is always a hot topic in the monitoring field. For example, when the object is a vehicle, monitoring the driving speed of the vehicle is of significant importance for avoiding traffic jam and planning route properly.

Currently, in a conventional method, the driving speed of the vehicle is monitored through an onboard Global Positioning System (GPS) apparatus. However, in this method, an additional GPS apparatus is required to be installed on the vehicle to be monitored. When communication with a satellite is failed due to failure in the GPS apparatus or driving in a tunnel or the like, the accuracy of this method will be affected largely.

SUMMARY

In view of the above, the present disclosure provides a method and an apparatus for measuring a speed of an object, which enables an efficient and accurate measurement of the speed of the object in a scenario without any additional apparatus to be installed on the object to be monitored, so as to facilitate the monitoring of objects in the scenario comprehensively and duly.

According to an embodiment of the present disclosure, a method for measuring a speed of an object is provided, comprising: acquiring, for each image frame of at least two image frames in an image sequence, image information of the image frame, wherein the image information comprises depth information; detecting at least one object in the image frame based on the depth information to obtain an object detection result for the image frame; tracking the at least one detected object based on the object detection result of each of the at least two image frames to obtain an object tracking result; and calculating the speed of the at least one detected object based on the object tracking result and a time difference between the at least two image frames.

According to another embodiment of the present disclosure, an apparatus for measuring a speed of an object is provided, comprising: a first acquiring unit operative to acquire, for each image frame of at least two image frames in an image sequence, image information of the image frame, wherein the image information comprises depth information; a detecting unit operative to detect at least one object in the image frame based on the depth information to obtain an object detection result for the image frame; a tracking unit operative to track the at least one detected object based on the object detection result of each of the at least two image frames to obtain an object tracking result; and a calculating unit operative to calculate the speed of the at least one detected object based on the object tracking result and a time difference between the at least two image frames.

According to a further embodiment of the present disclosure, an apparatus for measuring a speed of an object is provided, comprising: a processor; a memory; and computer program instructions stored in the memory, wherein the computer program instructions, when executed by the processor, cause the apparatus to perform steps of: acquiring, for each image frame of at least two image frames in an image sequence, image information of the image frame, wherein the image information comprises depth information; detecting at least one object in the image frame based on the depth information to obtain an object detection result for the image frame; tracking the at least one detected object based on the object detection result of each of the at least two image frames to obtain an object tracking result; and calculating the speed of the at least one detected object based on the object tracking result and a time difference between the at least two image frames.

According to still a further embodiment of the present disclosure, a computer program product is provided, the computer program product comprises a computer readable storage medium, and computer program instructions stored on the computer readable storage medium, wherein the computer program instructions are executable by a computer for causing the computer to perform steps of: acquiring, for each image frame of at least two image frames in an image sequence, image information of the image frame, wherein the image information comprises depth information; detecting at least one object in the image frame based on the depth information to obtain an object detection result for the image frame; tracking the at least one detected object based on the object detection result of each of the at least two image frames to obtain an object tracking result; and calculating the speed of the at least one detected object based on the object tracking result and a time difference between the at least two image frames.

In the method and the apparatus for measuring the speed of the object according to the embodiments of the present disclosure, the object is detected based on the depth information of the individual image frame, then the object is tracked and the speed of the object is detected. Therefore, the speed of the object in the scenario may be measured efficiently and accurately without any additional apparatus to be installed on the object to be monitored, so as to facilitate the monitoring of objects in the scenario comprehensively and duly.

Further, in the method and the apparatus for measuring the speed of the object according to the embodiments of the present disclosure, not only the speed of the object in the scenario may be measured efficiently and accurately, but also various processes such as an abnormal speed alert, a congestion degree prediction or the like may be performed using the speed, so as to further facilitate the monitoring of objects in the scenario comprehensively and duly.

DETAILED DESCRIPTION

Hereinafter, the embodiments of the present disclosure will be described in detail with reference to the accompany drawings.

First, a method for measuring a speed of an object according to an embodiment of the present disclosure will be described with reference to FIG. 1.

Figure 1:
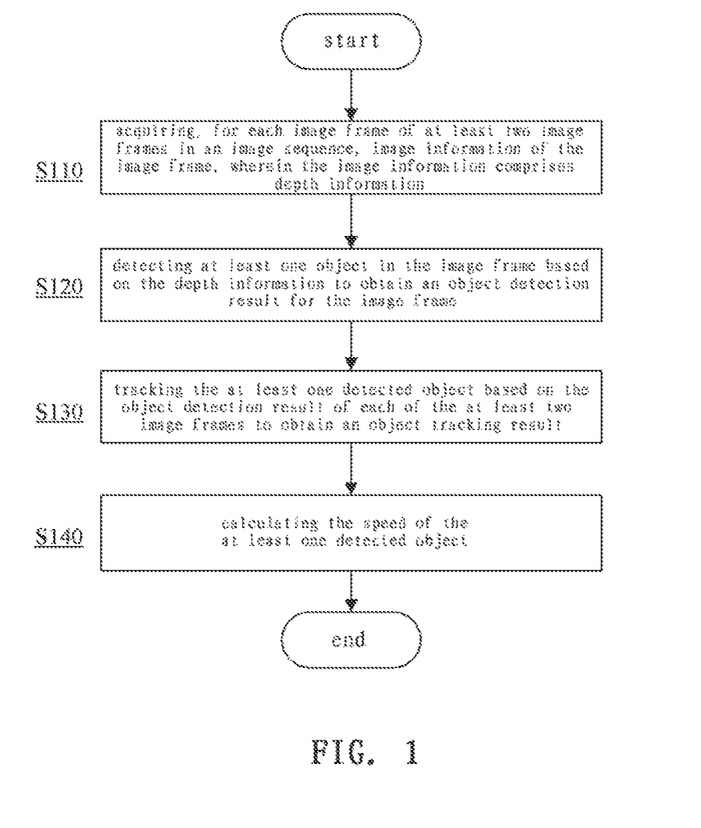
FIG. 1 is a flowchart showing main steps of a method for measuring a speed of an object according to an embodiment of the present disclosure.

FIG. 1 is a flowchart showing main steps of the method for measuring the speed of the object according to the embodiment of the present disclosure. The method according to the embodiment of the present disclosure is used for monitoring objects in a scenario. Hereinafter, a description will be made with reference to a vehicle as an example of the object. However, those skilled in the art should understand that, the method according to the embodiment of the present disclosure is not limited thereto, and may be applied to various other types of objects.

In the scenario, one or more cameras for capturing an image of at least one object existing in the scenario are arranged. The camera is a depth camera which can capture depth information of the at least one object in the image. In an embodiment, the camera is implemented by a stereo camera. In another embodiment, the camera is implemented by a Time of Flight (TOF) camera. Those skilled in the art should understand that the above description is only an example, and the method according to the embodiment of the present disclosure may be implemented by various other cameras, as long as it can capture the depth information.

In addition, alternatively, the arranged camera may be calibrated as a preparation, so as to obtain a transformation relationship from an image depth space to a three dimensional (3D) space which is exemplarily a camera coordinate system with the camera as the center, i.e., with the camera as the origin of the coordinate system.

Therefore, a video stream captured by the camera, which is an image sequence as described hereinafter, may be transmitted to a remote sever through network, and the method according to the embodiment of the present disclosure is applied at the remote server. Alternatively, the camera may be connected with a local processor and the method according to the embodiment of the present disclosure is applied at the local processor.

As shown in FIG. 1, first, at step S110, for each image frame of at least two image frames in an image sequence, image information of the image frame is acquired.

Particularly, the method according to the embodiment of the present disclosure may be applied to at least two image frames in the image sequence. Alternatively, in order to improve the accuracy of subsequent object detection and tracking processes, the method according to the embodiment of the present disclosure may be applied to each image frame in the image sequence.

More particularly, in a first embodiment, the image information comprises the depth information as described above which may be acquired by the depth camera as described above.

Then, at step S120, at least one object in the image frame is detected based on the depth information to obtain an object detection result for the image frame.

Particularly, in an embodiment, a process such as the edge detection or the like may be performed on the image frame based on the depth information to detect the at least one object in the image frame. The detailed process of the edge detection is known to those skilled in the art, and will not be described here in detail.

In another embodiment, at least one object in the image frame may be detected through a classifier based on the depth information. The classifier comprises, but is not limited to, the Support Vector Machine (SVM), the neutral network or the like.

Particularly, taking the neutral network as an example, first, the depth information may be input into the Convolutional Neural Network (CNN) to extract CNN features. More particularly, for example, the CNN may comprise a convolutional layer, a pooling layer, a ReLU layer, a fully connected layer, a softmax layer or the like. In addition, alternatively, the CNN may comprise a loss function. Therefore, the CNN features may be extracted by the pre-trained CNN.

Next, the extracted CNN features may be input into a trained Recurrent Neural Network (RNN) to obtain a location where the at least one object is located in the image frame and a confidence indicating a probability that the corresponding object exists at the location, wherein the object detection result includes the location information and the confidence of the at least one detected object. Specifically, in an embodiment, the at least one object can be abstracted into a corresponding point, the location where the at least one object is located may be represented by coordinate information of a predetermined reference point (e.g., the upper left point, the center point or the like) of the corresponding object. In another embodiment, the location where the object is located may be represented by coordinate information of the predetermined reference point as well as width and height information of the object in the image. More specifically, first, the object detection result of a previous image frame of the image frame (e.g., the previous image frame immediately before the image frame) may be acquired. Then, the extracted CNN features and the object detection result of the previous image frame of the image frame may be input into the RNN to obtain, through the RNN, the location where the at least one object is located in the image frame and the confidence indicating the probability that the corresponding object exists at the location, and the object detection result includes the location information and the confidence of the at least one detected object.

For example, the location of an object and the confidence indicating the probability that the object exists at the location are output in each detection process through the RNN. In addition, alternatively, an upper limit on the number of the objects that can be detected in each image frame may be set. Then, it is determined whether the ending condition is satisfied or not. When the ending condition hasn't been satisfied, the next detection process is performed. When the ending condition is satisfied, the locations where the objects are respectively located in the image frame and the corresponding confidences indicating the probabilities that the objects exists at the locations respectively are output as the object detection result for the image frame.

Exemplarily, the ending condition may be such that the number of the detected objects reaches the preset upper limit on the number of the objects that can be detected. Alternatively, the results of every detection process may be ranked in a predetermined order such as a descending order of the values of the confidences. Therefore, the ending condition may be such that the current output confidence is smaller than the preset threshold. Those skilled in the art should understand that the above ending condition is only an example, and those skilled in the art may design various other ending conditions.

In addition, with respect to the training of the RNN, first, for example, a network structure, of the RNN may be determined, for example, a VGG network can be implemented as the RNN. Then, alternatively, the network structure may be trimmed based on a preset training data set such as the KITTI or the like. In addition, alternatively, a loss function may be added to the network structure. The loss function may be calculated based on the Euclidean distance or the like. Therefore, the network structure which has been trimmed and/or added with the loss function is input into the RNN to perform the object detection.

In addition, those skilled in the art should understand that, after obtaining the location where the at least one object is located in the image frame and the confidence indicating the probability that the corresponding object exists at the location, in order to improve the accuracy of the object detection, alternatively, a post process such as a bounding box regression process or the like may also be added to further optimize the process result, and the optimized process result is output as the object detection result for the image frame.

Hereinabove, the detailed operation of the object detection has been described with reference to the neutral network combining the CNN with the RNN as an example. Those skilled in the art should understand that the above case is only an example, and the object may be detected based on the neutral network with various other structures which shall also fall within the protection scope of the present disclosure.

Further, in the first embodiment as described above, the description has been made taking an example in which the object is detected based on the depth information. Alternatively, in a second embodiment, the method according to the embodiment of the present disclosure may detect the object based on the depth information in combination with other image information.

Particularly, the image information may also comprise color information. In an embodiment, in the RGB color space, the RGB information of the image frame may be acquired as the color information. In another embodiment, in the HSV color space, the HSV information of the image frame may be acquired as the color information. Those skilled in the art should understand that the above is only an example. Depending on different color spaces that are adopted, corresponding color information may be acquired in the method according to the embodiment of the present disclosure. In addition, alternatively, when it is infrared imaged, the image information may also comprise infrared information.

Therefore, at the step S120, the object in the image frame may be detected based on the depth information and one of the color information and the infrared information to obtain the object detection result for the image frame. Similarly to the method as previously described, the method according to the embodiment of the present disclosure may detect the object based on the depth information and the one of the color information and the infrared information, in various ways such as the edge detection, the classifier or the like, the process of which is similar to that described above and will not be described here repeatedly.

It should be noted that the above description has been made with reference to the color information and the infrared information as an example. Those skilled in the art should understand that, depending on different imaging ways and different object detection ways that are adopted, the object may also be detected by combining the depth information with various other image information.

In the second embodiment, since the image information in another aspect is considered in addition to the depth information, the accuracy of the object detection is further improved.

In the above first and second embodiment, the object detection is performed based on the image information comprising the depth information of the image frame itself. Alternatively, in a third embodiment, the object detection may be performed based on the depth information of the image frame itself and inter-image information between at least two image frames.

Particularly, in this embodiment, optical flow information between at least two previous arbitrary image frames of the image frame in the image sequence may also be acquired as the inter-image information.

More particularly, the optical flow information may reflect a pixel-based motion offset between the at least two image frames. The optical flow information may be calculated from the at least two previous arbitrary image frame of the image frame through various optical flow calculation algorithms which have been known or to be developed in the art. Those skilled in the art should understand that the at least two previous arbitrary image frames of the image frame may comprise the image frame itself depending on different optical flow calculation algorithms that are adopted. Further, the optical flow information may be acquired from more than two previous image frames of the image frame.

Therefore, at the step S120, the at least one object in the image frame may be detected based on the depth information and the optical flow information to obtain the object detection result for the image frame. Particularly, the method according to the embodiment of the present disclosure may detect the object based on the depth information and the optical flow information, in various ways such as the edge detection, the classifier or the like, the process of which is similar to that as described above and will not be described here repeatedly.

It should be noted that the above description has been made with reference to the optical flow information as an example. Those skilled in the art should understand that, depending on different object detection ways that are adopted, the object may also be detected by combining the depth information with various other inter-image information.

In the third embodiment, since the inter-image information between at least two image frames is considered in addition to the depth information, the accuracy of the object detection is further improved.

Those skilled in the art should understand that the various embodiments described above may be combined, sub-combined, modified and alternated when appropriate. For example, the at least one object in the image frame may be detected based on the depth information, the inter-image information between at least two previous arbitrary image frames of the image frame, and one of the color information and the infrared information of the image frame, and so on.

After obtaining the object detection result for each of the at least two image frames respectively, the method proceeds to step S130. At the step S130, an object is tracked based on the object detection result of each of the at least two image frames to obtain an object tracking result.

Particularly, in an embodiment, the object may be tracked in a network flow based method.

Hereinafter, the detailed process of the object tracking in the network flow based method will be described with reference to the schematic diagrams shown in FIGS. 2 and 3.

Figure 2A:
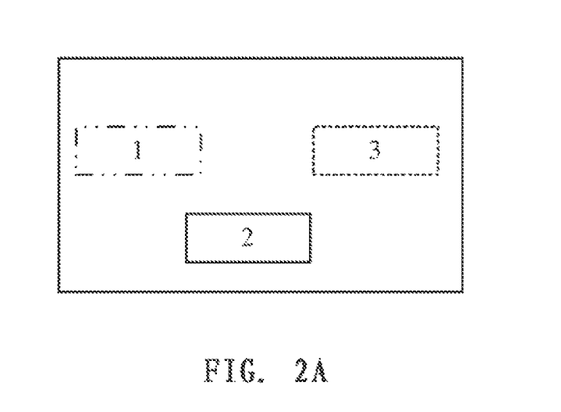
FIGS. 2A-2C are schematic diagrams showing object detection results of three image frames to which the method according to the embodiment of the present disclosure is applied.
Figure 2B:
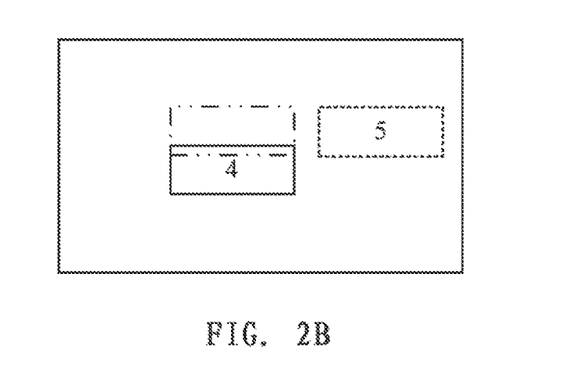
Figure 2C:
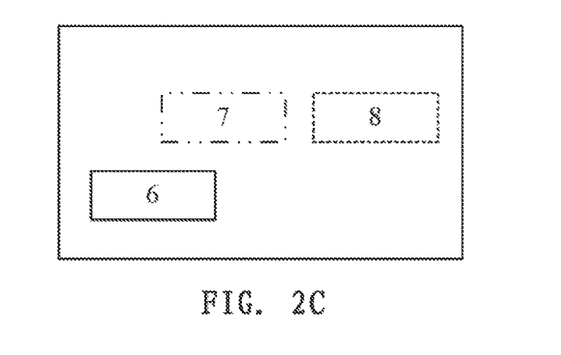

FIGS. 2A-2C are schematic diagrams showing the object detection results of three image frames to which the method according to the embodiment of the present disclosure is applied. Particularly, FIGS. 2A-2C show the object detection results of three image frames respectively which are arranged in a time order in the image sequence, wherein the object denoted in the same type of line in the FIGS. 2A-2C represents the same object actually. In the first image frame, three objects, denoted as 1, 2 and 3 respectively, are detected. In the second image frame, due to the blocking of the objects by each other, only two objects, denoted as 4 and 5 respectively, are detected. In the third image frame, the object which was blocked in the second frame is no longer blocked, and therefore three objects, denoted as 6, 7 and 8 respectively, are detected again. In the process of the step S130, the detection results for the individual frames need to be matched with each other so as to track the movement of the same object in the image sequence.

Figure 3A:
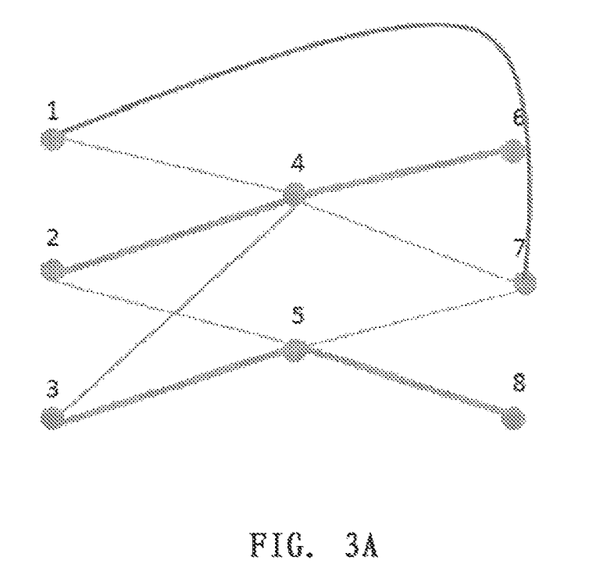
FIGS. 3A and 3B are schematic diagrams showing an object tracking process based on network flow for the scenario in FIG. 2.
Figure 3B:
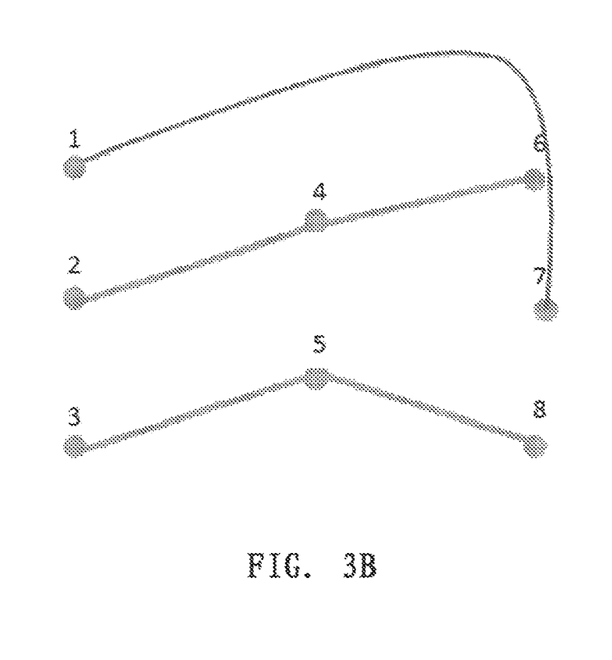

FIGS. 3A and 3B schematically show the object tracking process in a network flow based method for the scenario shown in FIG. 2.

First, a network graphical model including multiple nodes and edges is established based on the object detection result of each of the at least two image frames, wherein each of the edges is connected between two nodes. Each node represents each corresponding object detected in each image frame. Particularly, the network graphical model corresponding to FIGS. 2A-2C is shown in FIG. 3A for example, wherein the reference numerals 1-8 correspond to each object detected in the three image frames in FIGS. 2A-2C respectively. Each two objects are connected by an edge therebetween.

Then, at least one of color information, texture information and location information of each detected object is acquired, and a weight of each edge is calculated based on the at least one of the color information, the texture information and the location information of the detected object.

Exemplarily, the weight of each edge may be calculated by the expression (1) as follows:

$$E\_ij = \|c(i) - c(j)\| + a\|t(i) - t(j)\| + b\|p(i) - p(j)\| \quad (1)$$

wherein, i and j represent any two nodes in the graphical model, respectively;

E_ij represents the weight of an edge between the node i and the node j;

c(i) and c(j) represent the color information of the node i and the node j, respectively;

t(i) and t(j) represent the texture information of the node i and the node j, respectively;

p(i) and p(j) represent the spatial location information of the node i and the node j, respectively; and a and b are adjustment parameters respectively, which may be set by those skilled in the art when necessary.

Through the above calculation, the weight of each edge may be obtained, which represents a probability that two objects respectively corresponding to two nodes connected by a corresponding edge are the same object.

Therefore, the object tracking result is obtained based on the network graphical model and the weights.

Particularly, as shown in FIGS. 3A and 3B, the thicker of the edge, the larger of the weight. The thinner of the edge, the smaller of the weight. Therefore, a path of the largest network flow from the first image frame to the third image frame is found from the graph, and therefore the tracking result of a detected object is obtained. After obtaining the tracking result for the detected object, the path of this detected object is removed. Then, it continues to find the path of the largest network flow among the remaining paths, and so on. Finally, the object tracking result shown in FIG. 3B is obtained for the three image frames.

Those skilled in the art should understand that the above network flow based algorithm is only an example. Those skilled in the art may match the object detection results of individual frames through various algorithms that have been known or to be developed in the art to obtain the object tracking result. Exemplarily, the object tracking may be performed through a bipartite graph based algorithm, a Kalman filter based algorithm or the like.

After obtaining the object tracking result, the method proceeds to step S140. At the step S140, the speed of the at least one detected object is calculated based on the object tracking result and a time difference between the at least two image frames.

Particularly, first, a location offset of the at least one detected object between the at least two image frames may be calculated based on the tracking result of the at least one detected object. For example, the locations of the at least one object in the at least two image frames are determined respectively through the tracking result of the at least one object. Therefore, the Euclidean distance of the at least one object between the at least two image frames may be calculated as the location offset. In an embodiment, for each image frame of the at least two image frames, the 3D coordinate information of the at least one object in the 3D space, that is, the coordinate information in a predetermined 3D coordinate system (e.g., the camera coordinate system with the camera as the center), may be obtained based on the transformation relationship from the image depth space to the 3D space as described above, through the depth information and the 2D coordinate information of the object in the image frame (e.g., the depth information and the 2D coordinate information of the predetermined reference point such as the center of the object). Therefore, the Euclidean distance in the 3D space is calculated as the location offset based on the 3D coordinate information of the object between the two image frames. Hereinafter, a detailed description will be made on the calculation of the speed with reference to the expression (2). In another embodiment, for each image frame of the at least two image frames, the Euclidean distance in the 2D image space is calculated through the 2D coordinate information of the object. Then, the location offset is calculated by referring to the Euclidean distance in combination with information such as the depth information and the ratio of the size of the object in the image frame to the preset actual size or the like and scaling the Euclidean distance correspondingly. Those skilled in the art should understand that the above is only an example, and the location offset of the object between the at least two image frames may be calculated in various other ways.

After obtaining the location offset of the at least one detected object through the above calculation, the speed of the at least one object may be calculated based on the location offset and the time difference. For example, assuming that the at least two image frames are the (t−k)-th frame and the t-th frame respectively, the speed of the at least one object may be represented by the following expression (2):

$$v = \frac{d}{k/fr} = \frac{d \cdot fr}{k} \quad (2)$$

wherein, v is the speed of the at least one object in a unit of m/s, for example;

d is the location offset (e.g., the Euclidean distance of the at least one object in the 3D space as the location offset) in a unit of meter, for example;

k is a difference of frame numbers between the at least two image frames; and fr is the frame rate of the image sequence which is exemplarily 30 fps, 60 fps or the like.

In addition, alternatively, in order to make the calculation of the speed more accurate, in an embodiment of the present disclosure, the speeds of the at least one object at a plurality of timings in the image sequence may be calculated. Exemplarily, the speeds of the at least one object between the t-th frame and the (t−k)-th frame, between the t-th frame and the (t−2k)-th frame, and between the t-th frame and the (t−3k)-th frame or the like may be calculated. Then, the calculated plurality of speeds may be averaged to obtain an average speed of the at least one object in the image sequence.

The method for measuring the speed of the object according to the embodiment of the present disclosure has been described above with reference to FIGS. 1-3.

After measuring the speed of the object, the speed of the object may be used in various ways. In an embodiment, the speed may be used for an abnormal speed alert, such as an over speed alert or an ultra low speed alert. Particularly, a speed threshold may be set in advance. For example, a speed threshold which may be an upper limit or a speed threshold which is a lower limit may be set in advance. Then, it is determined whether the speed is higher than the upper limit or lower than the lower limit. The alert information is generated when it is determined that the speed is higher than the upper limit or lower than the lower limit. The alert information may be in various forms such as text, audio, image or the like. Then, the alert information may be output correspondingly. It is especially useful in a traffic monitoring application. For example, the existence of an object driving in the abnormal speed may be alerted and corresponding actions may be taken in time by measuring speeds of the vehicles in the monitored scenario. For example, the license plate number information of the vehicle driving in the abnormal speed may be acquired through image recognition and a warning may be made.

In another embodiment, the speed may be applied to the traffic condition prediction. Exemplarily, the speed of each detected object in the scenario may be calculated and aggregated into current object speed information. Further, on the other hand, reference information may be acquired. Particularly, the reference information may comprise at least one of historical quantity information of the detected objects, historical speed information of each detected object, weather information and peripheral information.

More particularly, for example, when the object is the vehicle, the historical quantity information of the detected objects comprises, for example, the number of detected vehicles at individual timings in the previous several hours in the scenario, the number of detected vehicles at the same timing in the previous day or several days or the like. The historical speed information of each detected object comprises, for example, the speeds of each vehicle at the individual timings in the previous several hours in the scenario, the speeds of each vehicle at the same timing in the previous day or several days or the like. The weather information comprises, for example, the weather information at the current timing or the like. The peripheral information comprises, for example, the traffic condition information in a predetermined range from the scenario or the like.

Those skilled in the art should understand that the above reference information is only an example, and various other reference information, for example, current time information, traffic control information or the like, may be acquired on the basis of it, which shall fall within the protection scope of the present disclosure.

After obtaining the current quantity information of the detected objects, the current speed information of each detected object and the reference information, a congestion degree of a scenario corresponding to the image sequence may be determined based on such information. Particularly, the current quantity information of the detected objects, the current speed information of each detected object and the reference information may be input into a RNN to determine the congestion degree. The congestion degree may be represented by a discrete value, for example.

With respect to the training of the RNN that is used to determine the congestion degree, for example, traffic flow data at different timings of individual scenarios may be collected in advance, and may be quantized and labeled manually. For example, first traffic flow data at a first timing in a first scenario is labeled as a high congestion degree, second traffic flow data at a second timing in a second scenario is labeled as a low congestion degree or the like. Therefore the traffic flow data which has been quantized and labeled is input to the RNN to train the RNN.

Two applications of the method according to the embodiment of the present disclosure have been described above taking an example in which the measured speed of the object is applied to the abnormal speed alert and the traffic condition prediction. Those skilled in the art should understand that the above is only an example, and the measured speed of the object may be applied to various other scenarios appropriately when necessary.

The method for measuring the speed of the object according to the embodiment of the present disclosure has been described above with reference to FIGS. 1-3. In the method according to the embodiment of the present disclosure, the object is detected based on the depth information of the image frames, and then the object is tracked and the speed of the object is detected. Therefore, the speed of the object in the scenario may be detected efficiently and accurately without any additional apparatus to be installed on the object to be monitored, so as to facilitate the monitoring of objects in the scenario comprehensively and duly.

Further, in the method for measuring the speed of the object according to the embodiments of the present disclosure, not only the speed of the object in the scenario may be measured efficiently and accurately, but also various processes such as the abnormal speed alert, the congestion degree prediction or the like may be performed using the speed, so as to further facilitate the monitoring of objects in the scenario comprehensively and duly.

Hereinafter, an apparatus for measuring a speed of an object according to the embodiment of the present disclosure will be described with reference to FIG. 4.

Figure 4:
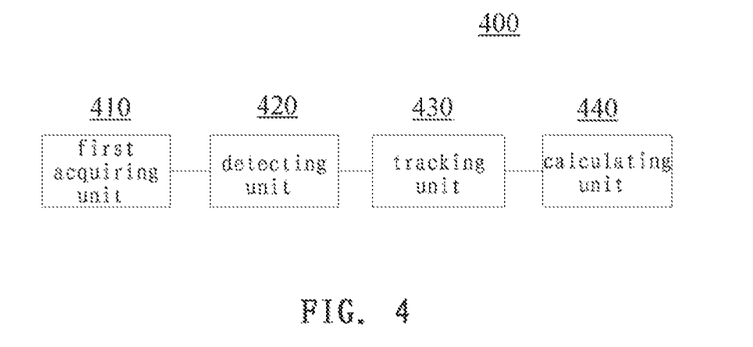
FIG. 4 is a block diagram showing a main configuration of an apparatus for measuring a speed of an object according to an embodiment of the present disclosure.

FIG. 4 is a block diagram showing a main configuration of an apparatus for measuring a speed of an object according to the embodiment of the present disclosure. As shown in FIG. 4, the apparatus 400 for measuring the speed of the object according to the embodiment of the present disclosure comprise a first acquiring unit 410, a detecting unit 420, a tracking unit 430 and a calculating unit 440.

The first acquiring unit 410 is operative to acquire, for each image frame of at least two image frames in an image sequence, image information of the image frame, wherein the image information comprises depth information. The detecting unit 420 is operative to detect at least one object in the image frame based on the depth information to obtain an object detection result for the image frame. The tracking unit 430 is operative to track the at least one detected object based on the object detection result of each of the at least two image frames to obtain an object tracking result. The calculating unit 440 is operative to calculate the speed of the at least one detected object based on the object tracking result and a time difference between the at least two image frames.

In an embodiment, the image information further comprises one of color information and infrared information. The detecting unit 420 is operative to detect the at least one object in the image frame based on the depth information and the one of the color information and the infrared information to obtain the object detection result for the image frame.

In another embodiment, the apparatus 400 further comprises a second acquiring unit (not shown), which is operative to acquire inter-image information between at least two previous arbitrary image frames of the image frame in the image sequence. The detecting unit 420 is operative to detect the at least one object in the image frame based on the depth information and the inter-image information to obtain the object detection result for the image frame.

In a further embodiment, the detecting unit 420 is operative to detect the at least one object in the image frame through a classifier based on the depth information to obtain the object detection result for the image frame.

In still a further embodiment, the classifier comprises the CNN and the RNN, and the detecting unit 420 comprises: a CNN processing unit operative to input the depth information into the CNN to extract CNN features; and an RNN processing unit operative to input the extracted CNN features into the RNN to obtain a location where the at least one object is located in the image frame and a confidence indicating a probability that the corresponding object exists at the location, wherein the object detection result comprises the location information and the confidence of the at least one detected object. As described above, the location where the object is located may be represented by coordinate information of a predetermined reference point (e.g., the upper left point, the center point or the like) of the corresponding object, or may be represented by coordinate information of the predetermined reference point as well as width and height information of the object in the image.

In still a further embodiment, the apparatus 400 further comprises: an intermediate result acquiring unit operative to acquire the object detection result of a previous image frame of the image frame, for example, the previous frame image immediate before the image frame, wherein, the RNN processing unit is operative to input the extracted CNN features and the object detection result of the previous image frame of the image frame into the RNN to obtain the location where the at least one object is located in the image frame and the confidence indicating the probability that the corresponding object exists at the location, wherein the object detection result comprises the location information and the confidence of the at least one object. The location where the at least one object is located may be represented by coordinate information of a predetermined reference point (e.g., the upper left point, the center point or the like) of the corresponding object, or may be represented by coordinate information of the predetermined reference point as well as width and height information of the corresponding object in the image.

In still a further embodiment, the tracking unit 430 comprises: a model establishing unit operative to establish a network graphical model including multiple nodes and multiple edges based on the object detection result of each of the at least two image frames, wherein each of the edges is connected between two nodes and wherein each node represents each object detected in each image frame; an object information acquiring unit operative to acquire at least one of color information, texture information and location information of each detected object; a weight calculating unit operative to calculate a weight of each edge based on the at least one of the color information, the texture information and the location information of each detected object, wherein the weight represents a probability that two objects respectively corresponding to two nodes connected by a corresponding edge are the same object; and a tracking result obtaining unit operative to obtain the object tracking result based on the network graphical model and the weight.

In still a further embodiment, the calculating unit 440 comprises: an offset calculating unit operative to calculate a location offset of the at least one detected object between the at least two image frames based on the tracking result of the at least one detected object; and a speed calculating unit operative to calculate the speed of the at least one detected object based on the location offset and the time difference.

In an embodiment, the offset calculating unit may calculate the location offset in various offset calculation ways as described in the method for measuring the speed of the object according to the embodiment of the present disclosure with reference to FIGS. 1-3. Then, the speed calculating unit may calculate the speed of the at least one detected object based on the location offset and the time difference. For example, assuming that the at least two image frames are the (t−k)-th frame and the t-th frame respectively, the speed of the at least one detected object may be represented by the above expression (2).

In still a further embodiment, the apparatus 400 further comprises: a determining unit operative to determine whether the speed is higher than an upper limit or lower than a lower limit; a generating unit operative to generate alert information when it is determined that the speed is higher than the upper limit or lower than the lower limit; and an output unit operative to output the alert information.

In still a further embodiment, the object detection result comprises current quantity information of the detected objects; the calculating unit 440 is operative to calculate the speed of each detected object to obtain current speed information of each detected object. The apparatus 400 further comprises: a third acquiring unit operative to acquire reference information comprising at least one of historical quantity information of the detected objects, historical speed information of each detected object, weather information and peripheral information; and a congestion degree determining unit operative to determine a congestion degree of a scenario corresponding to the image sequence based on the current quantity information of the detected objects, the current speed information of each detected object and the reference information.

In still a further embodiment, the congestion degree determining unit is operative to input the current quantity information of the detected objects, the current speed information of each detected object and the reference information into a RNN to determine the congestion degree.

The detailed configurations and operations of the units of the apparatus 400 have been described above in detail in the object speed measuring method according to the embodiment of the present disclosure with reference to FIGS. 1-3, and will not be repeated here.

Hereinafter, an apparatus for measuring a speed of an object according to another embodiment of the present disclosure will be described with reference to FIG. 5.

Figure 5:
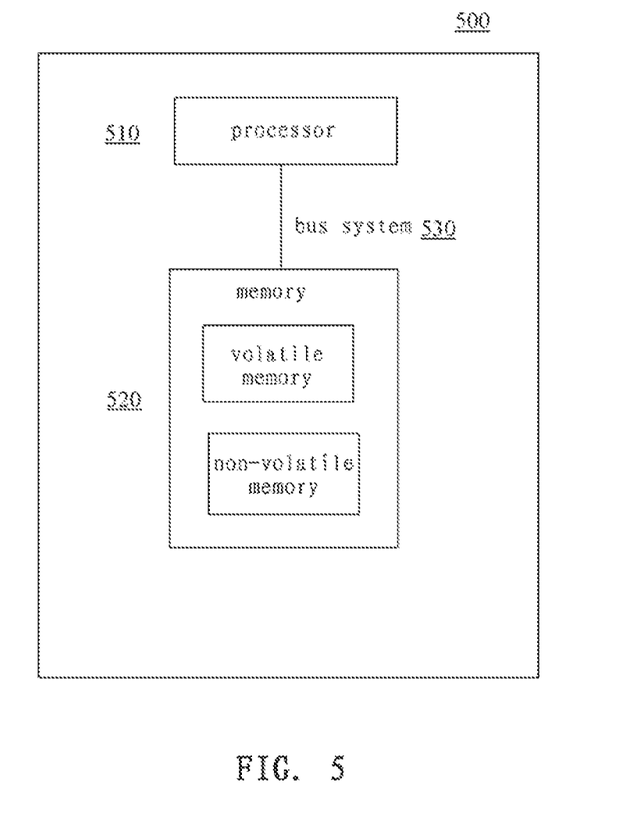
FIG. 5 is a block diagram showing a main configuration of an apparatus for measuring a speed of an object according to another embodiment of the present disclosure.

FIG. 5 is a block diagram illustrating a main configuration of an apparatus for measuring a speed of an object according to another embodiment of the present disclosure.

As shown in FIG. 5, an object speed measuring apparatus 500 according to the embodiment of the present disclosure mainly includes one or more processor(s) 510 and one or more memory (memories) 520. These components are interconnected with each other through a bus system 530 and/or a connection mechanism in other forms (not shown). It should be noted that the components and the structure of the object speed measuring apparatus 500 as shown in FIG. 5 are only exemplary but not limited, and the object speed measuring apparatus 500 may comprise other components with other structures when necessary.

The processor 510 may be a Central Processing Unit (CPU) or a processing unit in other forms having a data processing capability and/or an instruction execution capability, and may control other components in the object speed measuring apparatus 500 to perform a desired function.

The memory 520 may include computer readable storage media in various forms, for example, a volatile memory and/or a non-volatile memory. The volatile memory may, for example, include a Random Access Memory (RAM) and/or a cache memory (cache) or the like. The non-volatile memory may, for example, include a Read Only Memory (ROM), a hard disk, a flash memory or the like. There may be one or more computer program instructions stored on the computer readable storage media, which may be executed by the processor 510 so as to implement respective functions and/or other desired functions of method for measuring a speed of an object of the embodiment of the present disclosure as described herein.

According to an embodiment of the present disclosure, the computer program instructions, when executed by the processor 510, cause the object speed measuring apparatus 500 to perform steps of: acquiring, for each image frame of at least two image frames in an image sequence, image information of the image frame, wherein the image information comprises depth information; detecting at least one object in the image frame based on the depth information to obtain an object detection result for the image frame; tracking the at least one detected object based on the object detection result of each of the at least two image frames to obtain an object tracking result; and calculating the speed of the at least one detected object based on the object tracking result and a time difference between the at least two image frames.

In an embodiment, the image information further comprises one of color information and infrared information; and the step of detecting at least one object in the image frame based on the depth information performed by the object speed measuring apparatus 500, caused by the computer program instructions executed by the processor 510, comprises: detecting the at least one object in the image frame based on the depth information and the one of the color information and the infrared information to obtain the object detection result for the image frame.

In a further embodiment, the computer program instructions, when executed by the processor 510, further cause the object speed measuring apparatus 500 to perform steps of: acquiring inter-image information between at least two previous arbitrary image frames of the image frame in the image sequence; and the step of detecting the at least one object in the image frame performed by the object speed measuring apparatus 500, caused by the computer program instructions executed by the processor 510, comprises: detecting the at least one object in the image frame based on the depth information and the inter-image information to obtain the object detection result for the image frame.

In still a further embodiment, the step of detecting the at least one object in the image frame based on the depth information performed by the object speed measuring apparatus 500, caused by the computer program instructions executed by the processor 510, comprises: detecting the at least one object in the image frame through a classifier based on the depth information to obtain the object detection result for the image frame.

In still a further embodiment, the classifier comprises the CNN and the RNN, and the step of detecting the at least one object in the image frame performed by the object speed measuring apparatus 500, caused by the computer program instructions executed by the processor 510, comprises: inputting the depth information into the CNN to extract CNN features; and inputting the extracted CNN features into the RNN to obtain a location where the at least one object is located in the image frame and a confidence indicating a probability that the corresponding object exists at the location, wherein the object detection result comprises the location information and the confidence of the at least one detected object.

In still a further embodiment, the computer program instructions, when executed by the processor 510, further cause the object speed measuring apparatus 500 to perform steps of: acquiring the object detection result of a previous image frame of the image frame; and, the step of inputting the extracted CNN features into the RNN performed by the object speed measuring apparatus 500, which is caused by the computer program instructions executed by the processor 510, comprises: inputting the extracted CNN features and the object detection result of a previous image frame of the image frame into the RNN to obtain the location where the at least one object is located in the image frame and the confidence indicating the probability that the corresponding object exists at the location, wherein the object detection result comprises the location information and the confidence of the at least one object.

In still a further embodiment, the step of tracking the at least one object performed by the object speed measuring apparatus 500, caused by the computer program instructions executed by the processor 510, comprises: establishing a network graphical model including multiple nodes and multiple edges based on the object detection result of each of the at least two image frames, wherein each of the edges is connected between two nodes, and wherein each node represents each object detected in each image frame; acquiring at least one of color information, texture information and location information of each detected object; calculating a weight of each edge based on the at least one of the color information, the texture information and the location information of each detected object, wherein the weight represents a probability that two objects respectively corresponding to two nodes connected by a corresponding edge are the same object; and obtaining the object tracking result based on the network graphical model and the weight.

In still a further embodiment, the step of calculating the speed of the at least one detected object performed by the object speed measuring apparatus 500, caused by the computer program instructions executed by the processor 510, comprises: calculating a location offset of the at least one detected object between the at least two image frames based on the tracking result of the at least one detected object; and calculating the speed of the at least one detected object based on the location offset and the time difference.

In still a further embodiment, the computer program instructions, when executed by the processor 510, cause the object speed measuring apparatus 500 to perform steps of: determining whether the speed is higher than an upper limit or lower than a lower limit; generating alert information when it is determined that the speed is higher than the upper limit or lower than the lower limit; and outputting the alert information.

In still a further embodiment, the object detection result comprises current quantity information of the detected objects; the step of calculating the speed of at least one detected object performed by the object speed measuring apparatus 500, caused by the computer program instructions executed by the processor 510, comprises: calculating the speed of each detected object to obtain current speed information of each detected object; the computer program instructions, when read by the processor 510, cause the object speed measuring apparatus 500 to perform steps of: acquiring reference information comprising at least one of historical quantity information of the detected objects, historical speed information of each detected object, weather information and peripheral information; and determining a congestion degree of a scenario corresponding to the image sequence based on the current quantity information of the detected objects, the current speed information of each detected object and the reference information.

In still a further embodiment, the step of determining the congestion degree of the scenario corresponding to the image sequence performed by the object speed measuring apparatus 500, caused by the computer program instructions executed by the processor 510, comprises: inputting the current quantity information of the detected objects, the current speed information of each detected object and the reference information into a RNN to determine the congestion degree.

Further, a computer program product is provided according to another embodiment of the present disclosure, which includes a computer readable storage medium having stored thereon computer program instructions, wherein the computer program instructions, when executed by a computer or a processor, cause the computer or the processor to perform individual steps of the method for measuring the speed of the object according to the embodiment of the present disclosure, and realize the functions of the individual functional modules of the apparatus for measuring the speed of the object according to the embodiment of the present disclosure. The storage medium may comprise, for example, a memory card of a smart phone, a storage component of a tablet, a hard disk of a personal computer, a Read Only Memory (ROM), an Erasable Programmable Read Only Memory (EPROM), a portable Compact Disk-Read Only Memory (CD-ROM), a Universal Serial Bus (USB) memory or an arbitrary combination of the above storage medium.

In an embodiment, the computer program instructions, when executed by the computer, causes the computer to perform steps of: acquiring, for each image frame of at least two image frames in an image sequence, image information of the image frame, wherein the image information comprises depth information; detecting at least one object in the image frame based on the depth information to obtain an object detection result for the image frame; tracking the at least one detected object based on the object detection result of each of the at least two image frames to obtain an object tracking result; and calculating the speed of the at least one detected object based on the object tracking result and a time difference between the at least two image frames.

In an embodiment, the image information further comprises one of color information and infrared information; the step of detecting the object in the image frame performed by the computer, caused by the computer program instructions executed by the computer, comprises: detecting the at least one object in the image frame based on the depth information and the one of the color information and the infrared information to obtain the object detection result for the image frame.

In a further embodiment, the computer program instructions, when executed by the computer, further cause the computer to perform steps of: acquiring inter-image information between at least two previous arbitrary image frames of the image frame in the image sequence; the step of detecting the at least one object in the image frame performed by the computer, caused by the computer program instructions executed by the computer, comprises: detecting the at least one object in the image frame based on the depth information and the inter-image information to obtain the object detection result for the image frame.

In still a further embodiment, the step of detecting the at least one object in the image frame performed by the computer, caused by the computer program instructions executed by the computer, comprises: detecting the at least one object in the image frame through a classifier based on the depth information to obtain the object detection result for the image frame.

In still a further embodiment, the classifier comprises the CNN and the RNN, and the step of detecting the at least one object in the image frame performed by the computer, caused by the computer program instructions executed by the computer, comprises: inputting the depth information into the CNN to extract CNN features; and inputting the extracted CNN features into the RNN to obtain a location where the at least one object is located in the image frame and a confidence indicating a probability that the corresponding object exists at the location, wherein the object detection result comprises the location information and the confidence of the at least one detected object.

In still a further embodiment, the computer program instructions, when executed by the computer, cause the computer to perform steps of: acquiring the object detection result of a previous image frame of the image frame; and the step of inputting the extracted CNN features into the RNN performed by the computer, caused by the computer program instructions executed by the computer, comprises: inputting the extracted CNN features and the object detection result of the previous image frame of the image frame into the RNN to obtain the location where the at least one object is located in the image frame and the confidence indicating the probability that the corresponding object exists at the location, wherein the object detection result comprises the location information and the confidence of the at least one object.

In still a further embodiment, the step of tracking the at least one detected object performed by the computer, caused by the computer program instructions executed by the computer, comprises: establishing a network graphical model including multiple nodes and multiple edges based on the object detection result of each of the at least two image frames, wherein each of the edges is connected between two nodes and wherein each node represents each object detected in each image frame; acquiring at least one of color information, texture information and location information of each detected object; calculating a weight of each edge based on the at least one of the color information, the texture information and the location information of each detected object, wherein the weight represents a probability that two objects respectively corresponding to two nodes connected by a corresponding edge are the same object; and obtaining the object tracking result based on the network graphical model and the weight.

In still a further embodiment, the step of calculating the speed of at least one detected object performed by the computer, caused by the computer program instructions executed by the computer, comprises: calculating a location offset of the at least one detected object between the at least two image frames based on the tracking result of the at least one object; and calculating the speed of the at least one detected object based on the location offset and the time difference.

The computer program instructions, when executed by the computer, cause the computer to perform steps of: determining whether the speed is higher than an upper limit or lower than a lower limit; generating alert information when it is determined that the speed is higher than the upper limit or lower than the lower limit; and outputting the alert information.

In still a further embodiment, the object detection result comprises current quantity information of the detected objects; wherein the step of calculating the speed of at least one detected object performed by the computer, caused by the computer program instructions executed by the computer, comprises: calculating the speed of each detected object to obtain current object speed information of each detected object; and wherein the computer program instructions, when executed by the computer, cause the computer to perform steps of: acquiring reference information comprising at least one of historical quantity information of the detected objects, historical speed information of each detected object, weather information and peripheral information; and determining a congestion degree of a scenario corresponding to the image sequence based on the current quantity information of the detected objects, the current speed information of each detected object and the reference information.

Further, the step of determining the congestion degree of the scenario corresponding to the image sequence performed by the computer, caused by the computer program instructions executed by the computer, comprises: inputting the current quantity information of the detected objects, the current speed information of each detected object and the reference information into a RNN to determine the congestion degree.

The apparatuses for measuring the speed of the object according to the embodiment of the present disclosure have been described above with reference to FIGS. 4 and 5. In the apparatuses according to the embodiment of the present disclosure, the object is detected based on the depth information of the image frames, and then the object is tracked and the speed of the object is detected. Therefore, the speed of the object in the scenario may be detected efficiently and accurately without any additional apparatus to be installed on the object to be monitored, so as to facilitate the monitoring of objects in the scenario comprehensively and duly.

Further, in the apparatuses for measuring the speed of the object according to the embodiments of the present disclosure, not only the speed of the object in the scenario may be measured efficiently and accurately, but also various processes such as the abnormal speed alert, the congestion degree prediction or the like may be performed using the speed, so as to further facilitate the monitoring of objects in the scenario comprehensively and duly.

The method and the apparatus for measuring the speed of the object according to the embodiments of the present disclosure have been described above with reference to FIGS. 1-5.

It is to be noted that in the specification, the terms comprising, containing or any other variation are intended to cover non-exhaustively inclusion, so that a process, a method, a product or a device comprising a series of elements not only include those elements, but may also include other elements not listed explicitly, or include elements inherent to the process, the method, the product or the device. Without any other limitation, an element limited by the expression "comprising a" does not exclude there being additional identical elements included in the process, the method, the product or the device comprising the element.

Further, it is to be noted that in the specification, the expressions similar to a first . . . unit, a second . . . unit are only for convenience to distinguish, and do not mean that they must be implemented as two or more units physically separated. In fact, the units may be implemented as one single unit integrally, or multiple units as necessary.

Finally, it is to be noted that the above-described series of process not only include the processes performed in a time order, but may also include processes in parallel or individually other than in the time order.

From the description of the embodiments, those skilled in the art should understand clearly that the present disclosure may be implemented by software in combination with necessary hardware platform, and of course the present disclosure may also be fully implemented by hardware. Based on such understanding, the part of the technical solution of the invention which contributes to the prior art may be embodied in whole or in part in the form of a software product. This computer software product can be stored in a storage medium, such as a ROM/RAM, a disk, an optical disc and the like, and include many instructions to cause a computer device (may be personal computer, server or network device etc.) to implement the embodiments of the invention or method described by some parts of the embodiment.

In the embodiment of the present disclosure, the module/unit may be realized by software so as to be executed by various processors. For example, an identified executable code module may comprise one or more physical or logical blocks of the computer instructions, which may, for example, be constructed as an object, a process or a function. Nevertheless, the executable codes of the identified module are not necessary to be located together physically, and may comprise different instructions stored at different locations, which may construct a module and achieve the predetermined purpose of the module when being combined together logically.

When the module is realized by software, considering the existing hardware manufacture process, those skilled in the art may implement its function by corresponding hardware circuits comprising the normal VLSI circuit or the existing semiconductor such as a logical chip or a transistor, or other separate elements, regardless of cost. The module may also be implemented by a programmable hardware device, such as a field programmable gate array, a programmable array logic, or a programmable logical device, etc.

The above are only embodiments of the present disclosure. It should be noted that various modifications and alternations may be made by those of ordinary skilled in the art without departing from the principle of the present disclosure, which should also be viewed as falling within the protection scope of the present disclosure.

What is claimed is:

1. A method for measuring a speed of an object, comprising: acquiring, for each image frame of at least two image frames in an image sequence, image information of the image frame, wherein the image information comprises depth information; detecting at least one object in the image frame based on the depth information to obtain an object detection result for the image frame; tracking the at least one detected object based on the object detection result of each of the at least two image frames to obtain an object tracking result; and calculating the speed of the at least one detected object based on the object tracking result and a time difference between the at least two image frames, wherein the step of detecting at least one object in the image frame based on the depth information comprises: detecting the at least one object in the image frame through a classifier based on the depth information to obtain the object detection result for the image frame, wherein the classifier comprises the Convolutional Neural Network (CNN) and the Recurrent Neural Network (RNN), and the step of detecting at least one object in the image frame comprises: inputting the depth information into the CNN to extract CNN features; and inputting the extracted CNN features into the RNN to obtain a location where the at least one object is located in the image frame and a confidence indicating a probability that a corresponding object exists at the location, wherein the object detection result comprises the location information where the at least one object is located and the confidence of the corresponding object exist at the location.

2. The method of claim 1, wherein the image information further comprises one of color information and infrared information; and
wherein the step of detecting at least one object in the image frame based on the depth information comprises:
detecting the at least one object in the image frame based on the depth information and the one of the color information and the infrared information to obtain the object detection result for the image frame.

3. The method of claim 1, further comprising:
acquiring inter-image information between at least two previous arbitrary image frames of the image frame in the image sequence;
wherein the step of detecting at least one object in the image frame based on the depth information comprises:
detecting the at least one object in the image frame based on the depth information and the inter-image information to obtain the object detection result for the image frame.

4. The method of claim 1, further comprising:
acquiring the object detection result of a previous image frame of the image frame; and
wherein the step of inputting the extracted CNN features into the RNN comprises:
inputting the extracted CNN features and the object detection result of the previous image frame of the image frame into the RNN to obtain the location where the at least one object is located in the image frame and the confidence indicating the probability that the corresponding object exists at the location, wherein the object detection result comprises the location information and the confidence of the at least one object.

5. The method of claim 1, wherein the step of tracking the at least one detected object comprises:
establishing a network graphical model comprising a plurality of nodes and a plurality of edges based on the object detection result of each of the at least two image frames, wherein each of the edges is connected between two nodes and wherein each node represents each object detected in each image frame;
acquiring at least one of color information, texture information and location information of each detected object;
calculating a weight of each edge based on the at least one of the color information, the texture information and the location information of each detected object, wherein the weight represents a probability that two objects respectively corresponding to two nodes connected by a corresponding edge are the same object; and
obtaining the object tracking result based on the network graphical model and the weight.

6. The method of claim 1, wherein the step of calculating the speed of the at least one detected object comprises:
calculating a location offset of the at least one detected object between the at least two image frames based on the tracking result of the at least one detected object; and
calculating the speed of the at least one detected object based on the location offset and the time difference.

7. The method of claim 1, further comprising:
determining whether the speed is higher than an upper limit or lower than a lower limit;
generating alert information when it is determined that the speed is higher than the upper limit or lower than the lower limit; and
outputting the alert information.

8. The method of claim 1, wherein the object detection result comprises current quantity information of the detected objects;
wherein the step of calculating the speed of the at least one detected object comprises:
calculating the speed of each detected object to obtain current speed information of each detected object; and
wherein the method further comprises:
acquiring reference information comprising at least one of historical quantity information of the detected objects, historical speed information of each detected object, weather information and peripheral information; and
determining a congestion degree of a scenario corresponding to the image sequence based on the current quantity information of the detected objects, the current speed information of each detected object and the reference information.

9. The method of claim 8, wherein the step of determining the congestion degree of the scenario corresponding to the image sequence comprises:
inputting the current quantity information of the detected objects, the current speed information of each detected object and the reference information into a RNN to determine the congestion degree.

10. An apparatus for measuring a speed of an object, comprising: a processor; a memory; and computer program instructions stored in the memory, wherein the computer program instructions, when executed by the processor, cause the apparatus to performs steps of: acquiring, for each image frame of at least two image frames in an image sequence, image information of the image frame, wherein the image information comprises depth information; detecting at least one object in the image frame based on the depth information to obtain an object detection result for the image frame; tracking the at least one detected object based on the object detection result of each of the at least two image frames to obtain an object tracking result; and calculating the speed of the at least one detected object based on the object tracking result and a time difference between the at least two image frames, wherein the step of detecting at least one object in the image frame based on the depth information comprises: detecting the at least one object in the image frame through a classifier based on the depth information to obtain the object detection result for the image frame, wherein the classifier comprises the Convolutional Neural Network (CNN) and the Recurrent Neural Network (RNN), and the step of detecting at least one object in the image frame comprises: inputting the depth information into the CNN to extract CNN features; and inputting the extracted CNN features into the RNN to obtain a location where the at least one object is located in the image frame and a confidence indicating a probability that a corresponding object exists at the location, wherein the object detection result comprises the location information where the at least one object is located and the confidence of the corresponding object exist at the location.

11. The apparatus of claim 10, wherein the image information further comprises one of color information and infrared information; and
wherein the step of detecting at least one object in the image frame based on the depth information comprises: detecting the at least one object in the image frame based on the depth information and the one of the color information and the infrared information to obtain the object detection result for the image frame.

12. The apparatus of claim 10, wherein the computer program instructions, when executed by the processor, cause the apparatus to perform steps of:
acquiring inter-image information between at least two previous arbitrary image frames of the image frame in the image sequence; and
wherein the step of detecting at least one object in the image frame based on the depth information comprises: detecting the at least one object in the image frame based on the depth information and the inter-image information to obtain the object detection result for the image frame.

13. The apparatus of claim 10, wherein the computer program instructions, when executed by the processor, cause the apparatus to perform steps of:
acquiring the object detection result of a previous image frame of the image frame; and
wherein the step of inputting the extracted CNN features into the RNN comprises:
inputting the extracted CNN features and the object detection result of the previous image frame of the image frame into the RNN to obtain the location where the at least one object is located in the image frame and the confidence indicating the probability that the corresponding object exists at the location, wherein the object detection result comprises the location information and the confidence of the at least one object.

14. The apparatus of claim 10, wherein the step of tracking the at least one detected object comprises:

establishing a network graphical model comprising a plurality of nodes and a plurality of edges based on the object detection result of each of the at least two image frames, wherein each of the edges is connected between two nodes, and wherein each node represents each object detected in each image frame;
acquiring at least one of color information, texture information and location information of each detected object;
calculating a weight of each edge based on the at least one of the color information, the texture information and the location information of each detected object, wherein the weight represents a probability that two objects respectively corresponding to two nodes connected by a corresponding edge are the same object; and
obtaining the object tracking result based on the network graphical model and the weight.

15. The apparatus of claim 10, wherein the step of calculating the speed of the at least one detected object comprises:
calculating a location offset of the at least one detected object between the at least two image frames based on the tracking result of the at least one detected object; and
calculating the speed of the at least one detected object based on the location offset and the time difference.

16. The apparatus of claim 10, wherein the computer program instructions, when executed by the processor, cause the apparatus to perform steps of:
determining whether the speed is higher than an upper limit or lower than a lower limit;
generating alert information when it is determined that the speed is higher than the upper limit or lower than the lower limit; and
outputting the alert information.

17. The apparatus of claim 10, wherein the object detection result comprises current quantity information of the detected objects;
wherein the step of calculating the speed of the at least one detected object comprises:
calculating the speed of each detected object to obtain current speed information of each detected object; and
wherein the computer program instructions, when executed by the processor, cause the apparatus to perform steps of:
acquiring reference information comprising at least one of historical quantity information of the detected objects, historical speed information of each detected object, weather information and peripheral information; and
determining a congestion degree of a scenario corresponding to the image sequence based on the current quantity information of the detected objects, the current speed information of each detected object and the reference information.

18. The apparatus of claim 17, wherein the step of determining the congestion degree of the scenario corresponding to the image sequence comprises:
inputting the current quantity information of the detected objects, the current speed information of each detected object and the reference information into a RNN to determine the congestion degree.

* * * * *